United States Patent
Guan et al.

(10) Patent No.: US 10,909,888 B2
(45) Date of Patent: Feb. 2, 2021

(54) ELECTRONIC PRICE TAG, ELECTRONIC PRICE TAG SYSTEM AND METHOD OF UPDATING ELECTRONIC PRICE TAG

(71) Applicant: BOE TECHNOLOGY GROUP CO., LTD., Beijing (CN)

(72) Inventors: Hongtao Guan, Beijing (CN); Kai Zhao, Beijing (CN); Tailiang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/395,573

(22) Filed: Apr. 26, 2019

(65) Prior Publication Data
US 2020/0005683 A1  Jan. 2, 2020

(30) Foreign Application Priority Data
Jul. 2, 2018 (CN) .......................... 2018 1 0710370

(51) Int. Cl.
G05B 19/00 (2006.01)
G09F 3/20 (2006.01)
H04W 4/35 (2018.01)
G06K 19/077 (2006.01)

(52) U.S. Cl.
CPC ....... *G09F 3/208* (2013.01); *G06K 19/07758* (2013.01); *H04W 4/35* (2018.02)

(58) Field of Classification Search
CPC .... G09F 3/208; H04W 4/35; G06K 19/07758
USPC ........................................................ 340/5.3
See application file for complete search history.

(56) References Cited

U.S. PATENT DOCUMENTS

| | | | | |
|---|---|---|---|---|
| 4,918,432 A | * | 4/1990 | Pauley | G08B 21/22 340/10.1 |
| 6,304,182 B1 | * | 10/2001 | Mori | G08B 13/2414 340/545.6 |
| 6,812,838 B1 | * | 11/2004 | Maloney | G06K 7/10079 340/568.1 |
| 8,683,723 B2 | | 4/2014 | Sjödin et al. | |
| 2004/0008179 A1 | | 1/2004 | Chung et al. | |
| 2012/0091162 A1 | * | 4/2012 | Overhultz | A47F 1/126 221/1 |

(Continued)

FOREIGN PATENT DOCUMENTS

CN 1462903 A 12/2003
CN 102081806 A 6/2011
(Continued)

OTHER PUBLICATIONS

Chinese Office Action in Chinese Application No. 201810710370.2, dated Nov. 27, 2020 with English translation.

*Primary Examiner* — Zhen Y Wu
(74) *Attorney, Agent, or Firm* — Collard & Roe, P.C.

(57) ABSTRACT

An electronic price tag, an electronic price tag system, and a method of updating an electronic price tag. The electronic price tag includes a reed switch sensor and a processor. The reed switch sensor is configured to sense a magnetic field adjacent to the electronic price tag to generate an output signal. The processor is configured to: receive the output signal of the reed switch sensor, convert the output signal into information indicating whether the electronic price tag is normal, and send the information indicating whether the electronic price tag is normal.

18 Claims, 3 Drawing Sheets

(56) References Cited

U.S. PATENT DOCUMENTS

| | | | | |
|---|---|---|---|---|
| 2013/0173288 A1* | 7/2013 | Masuda | ............. | G06F 19/00 |
| | | | | 705/2 |
| 2014/0144976 A1* | 5/2014 | Angus | ............. | G07D 7/003 |
| | | | | 235/375 |
| 2017/0004691 A1* | 1/2017 | Alicot | ............. | G08B 13/2434 |
| 2017/0220985 A1* | 8/2017 | White | ............. | H04L 67/125 |
| 2018/0121778 A1* | 5/2018 | Jung | ............. | G06K 7/0008 |
| 2018/0284881 A1* | 10/2018 | Briggs | ............. | A63G 21/18 |
| 2019/0027009 A1* | 1/2019 | Miettinen | ............. | G08B 13/1463 |
| 2019/0362300 A1* | 11/2019 | Bottine | ............. | G06Q 30/02 |

FOREIGN PATENT DOCUMENTS

| | | | | |
|---|---|---|---|---|
| CN | 102365667 A | | 2/2012 | |
| CN | 103324965 A | * | 9/2013 | ............. G09F 3/208 |
| CN | 203287906 U | | 11/2013 | |
| CN | 103679430 A | | 3/2014 | |
| CN | 106650883 A | | 5/2017 | |
| CN | 207473634 U | | 6/2018 | |

* cited by examiner

ELECTRONIC PRICE TAG, ELECTRONIC PRICE TAG SYSTEM AND METHOD OF UPDATING ELECTRONIC PRICE TAG

CROSS-REFERENCE TO RELATED APPLICATION

The present application claims priority to the Chinese Patent Application No. 201810710370.2, filed Jul. 2, 2018, the disclosure of which is incorporated herein by reference as part of the present application.

TECHNICAL FIELD

The embodiments of the present disclosure relate to an electronic price tag, an electronic price tag system and a method of updating the electronic price tag.

BACKGROUND

Electronic shelf label system (ESL) is one of the most typical applications of the Internet of Things in the commercial field, and is an electronic display device placed on a shelf that can replace the traditional paper price tag. Each electronic shelf label is connected to the computer database of the shopping mall via a wireless network and displays the latest product price through the display of the electronic shelf label. The electronic shelf label may achieve the consistency between the cashier commodity price and the shelf label price, and has the advantages of simple operation, not requiring a large amount of paper resources and manpower, etc.

SUMMARY

At least an embodiment of the present disclosure provides an electronic price tag, comprising a reed switch sensor and a processor, wherein
the reed switch sensor is configured to sense a magnetic field adjacent to the electronic price tag to generate an output signal; and
the processor is configured to: receive the output signal of the reed switch sensor, convert the output signal into information indicating whether the electronic price tag is normal, and send the information indicating whether the electronic price tag is normal.

For example, in the electronic price tag according to some embodiments of the present disclosure, the processor is configured to:
receive a first signal outputted by the reed switch sensor, convert the first signal into information indicating that the electronic price tag is normal, and send the information indicating that the electronic price tag is normal; or
receive a second signal outputted by the reed switch sensor, convert the second signal into information indicating that the electronic price tag is abnormal, and send the information indicating that the electronic price tag is abnormal.

For example, in the electronic price tag according to some embodiments of the present disclosure, the first signal is a signal generated by the reed switch sensor in case of sensing a magnetic field; and
the second signal is a signal generated by the reed switch sensor in case of not sensing a magnetic field.

For example, in the electronic price tag according to some embodiments of the present disclosure, the reed switch sensor is a normally-open reed switch sensor; and a level of the first signal is lower than a level of the second signal.

For example, the electronic price tag according to some embodiments of the present disclosure further comprises:
a display screen configured to display item information under a control of the processor.

For example, in the electronic price tag according to some embodiments of the present disclosure, the display screen comprises an electronic paper screen.

For example, in the electronic price tag according to some embodiments of the present disclosure further comprises:
a communication apparatus configured to receive item information sent by a server and send the item information to the processor.

For example, in the electronic price tag according to some embodiments of the present disclosure, the communication apparatus comprises a radio-frequency transceiver, and the radio-frequency transceiver is configured to communicate with the server based on a 2.4G wireless communication protocol.

For example, the electronic price tag according to some embodiments of the present disclosure further comprises:
a memory unit configured to store character library information for displaying item information.

At least an embodiment of the present disclosure further provides an electronic price tag system, which comprises a shelf rail and the electronic price tag according to any of the above embodiments, wherein
a magnet is disposed on the shelf rail; and
the reed switch sensor is configured to generate the output signal under an action of the magnet in a case where the electronic price tag is mounted on the shelf rail.

For example, in the electronic price tag system according to some embodiments of the present disclosure, the reed switch sensor is configured to be closed under the action of the magnet to generate the output signal, so that the processor converts the output signal into information indicating that the electronic price tag is normal.

For example, the electronic price tag system according to some embodiments of the present disclosure further comprises:
a handheld terminal configured to: acquire an identifier of the electronic price tag and an item identifier on a corresponding shelf, bind the identifier of the electronic price tag with the item identifier to generate binding information, and send the binding information to the server; and
the server is configured to: receive the binding information, acquire the identifier of the electronic price tag and the item identifier, and send item information corresponding to the item identifier to the electronic price tag.

For example, in the electronic price tag system according to some embodiments of the present disclosure, the electronic price tag is configured to receive and display the item information.

For example, in the electronic price tag system according to some embodiments of the present disclosure, the electronic price tag is configured to:
send information indicating that the electronic price tag is normal to the server in a case where the reed switch sensor is closed; and
send information indicating that the electronic price tag is abnormal to the server in a case where the reed switch sensor is disconnected.

For example, in the electronic price tag system according to some embodiments of the present disclosure, the electronic price tag is configured to:

send information indicating that the electronic price tag is normal to the server, based on the output signal generated by the reed switch sensor in a case where the reed switch sensor senses the magnet; and send information indicating that the electronic price tag is abnormal to the server, based on the output signal generated by the reed switch sensor in a case where the reed switch sensor does not sense the magnet.

For example, in the electronic price tag system according to some embodiments of the present disclosure, the electronic price tag is configured to: send information indicating that the electronic price tag is normal or information indicating that the electronic price tag is abnormal to the server in real time.

For example, in the electronic price tag system according to some embodiments of the present disclosure, the server is configured to:

send an alarm message to an alarm device in response to receiving the information indicating that the electronic price tag is abnormal, so as to trigger the alarm device to give an alarm.

At least an embodiment of the present disclosure further provides a method of updating an electronic price tag, comprising:

acquiring by a handheld terminal an identifier of the electronic price tag and an item identifier on a corresponding shelf, binding the identifier of the electronic price tag with the item identifier to generate binding information, and sending the binding information to a server;

receiving by a server the binding information, acquiring the identifier of the electronic price tag and the item identifier, and sending item information corresponding to the item identifier to the electronic price tag; and receiving and displaying by the electronic price tag the item information, and sending information indicating that the electronic price tag is normal or information indicating that the electronic price tag is abnormal to the server in real time, wherein the electronic price tag comprises a reed switch sensor and a processor, the reed switch sensor is configured to sense a magnetic field adjacent to the electronic price tag to generate an output signal, and the processor is configured to: receive the output signal of the reed switch sensor, convert the output signal into information indicating whether the electronic price tag is normal, and send the information indicating whether the electronic price tag is normal.

For example, in the method of updating an electronic price tag according to some embodiments of the present disclosure, the electronic price tag sends information indicating that the electronic price tag is normal to the server in a case where the reed switch sensor is closed, and the electronic price tag sends information indicating that the electronic price tag is abnormal to the server in a case where the reed switch sensor is disconnected.

For example, the method of updating an electronic price tag according to some embodiments of the present disclosure further comprises:

sending by the server an alarm message to an alarm device in response to receiving the information indicating that the electronic price tag is abnormal, so as to trigger the alarm device to given an alarm.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The electronic price tag is usually mounted on the shelf through a corresponding clamping groove plate, mostly a plastic clamping groove plate, which is convenient to replace the electronic price tag. However, at the same time, the electronic price tag is easy to be taken away. When the electronic price tag is taken away or placed at another product location, the server may not confirm in real time the status of the tag being moved, thereby resulting in the problem of being unable to update the label data or the problem of displaying and updating incorrect product price information.

At least one embodiment of the present disclosure provides an electronic price tag, which comprises a reed switch sensor and a processor. The reed switch sensor is configured to sense a magnetic field adjacent to the electronic price tag to generate an output signal. The processor is configured to: receive the output signal of the reed switch sensor, convert the output signal into information indicating whether the electronic price tag is normal, and send the information indicating whether the electronic price tag is normal.

Figure 1:
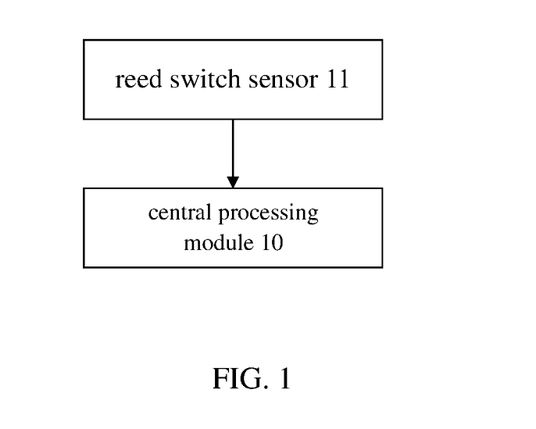
FIG. 1 is a schematic structural diagram of an electronic price tag provided by at least one embodiment of the present disclosure.

At least one embodiment of the present disclosure provides an electronic price tag, which, as shown in FIG. 1 which is a schematic structural diagram of the electronic price tag, comprises a reed switch sensor 11 and a central processing module 10. The reed switch sensor 11 senses a magnetic field adjacent to the electronic price tag to generate an output signal; and the central processing module 10 receives the output signal of the reed switch sensor, converts the output signal into information indicating whether the electronic price tag is normal, and sends the information indicating whether the electronic price tag is normal. It should be noted that the structure of the electronic price tag as shown in FIG. 1 is only illustrative but not limitative. The central processing module 10 is one example of the above processor, and no limitation will be given here in the embodiment of the present disclosure.

Reed switch is a hermetically sealed magnetron mechanical switch invented by Western Electric in 1940. A reed switch can be used as a magnetic proximity switch or a relay. Compared with a general mechanical switch, the reed switch has the advantages of small volume, high speed and long operating life. Compared with an electronic switch, the reed switch has the characteristics of high load shock resistance and high work reliability. When there is no magnetic field, two reeds in a glass tube are separated. When a magnetic substance is close to the glass tube, the two reeds in the tube are magnetized to attract and contact each other under the action of the magnetic lines of force of the magnetic field, so that the circuit connected by two pins can be connected. After the external magnetic force disappears, the two reeds are separated due to their own elasticity, and the circuit is disconnected.

In some embodiments, the reed switch sensor 11 generates a first signal in the case of sensing the action of a magnetic field, and generates a second signal in the case of not sensing the action of a magnetic field.

In some embodiments, the central processing module 10 is configured to:

receive the first signal outputted by the reed switch sensor 11, convert the first signal into information indicating that the electronic price tag is normal, and send the information indicating that the electronic price tag is normal; or receive the second signal outputted by the reed switch sensor 11, convert the second signal into information indicating that the electronic price tag is abnormal, and send the information indicating that the electronic price tag is abnormal.

Figure 2:
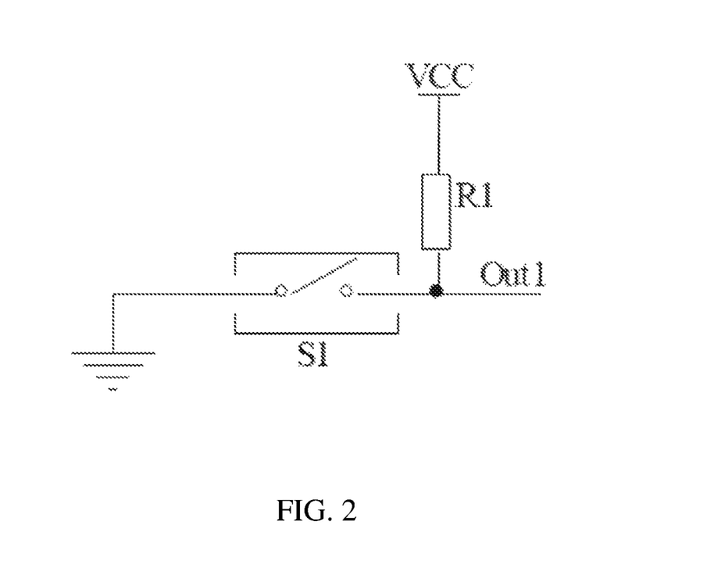
FIG. 2 is a schematic circuit diagram of a reed switch sensor in at least one embodiment of the present disclosure.

In some exemplary embodiments of the present disclosure, the reed switch sensor 11 is a normally-open reed switch sensor. FIG. 2 is a schematic circuit diagram of the reed switch sensor in some embodiments of the present disclosure. As can be seen from FIG. 2, when a magnetic substance is close to the reed switch sensor 11, two reeds in the reed switch are magnetized to attract and contact each other (namely a switch S1 is closed); an output terminal Out1 of the reed switch sensor 11 outputs a low level signal; and at this point, the central processing module 10 receives the low level signal outputted by the reed switch sensor 11, converts the low level signal into information indicating that the electronic price tag is normal, and sends the information indicating that the electronic price tag is normal. When the magnetic substance is away from the reed switch sensor 11, the two reeds are separated due to their own elasticity (namely the switch S1 is disconnected); the output terminal Out1 of the reed switch sensor 11 outputs a high level signal; and the central processing module 10 receives the high level signal outputted by the reed switch sensor 11, converts the high level signal into information indicating that the electronic price tag is abnormal, and sends the information indicating that the electronic price tag is abnormal. The low level signal is an example of the above first signal, and the high level signal is an example of the above second signal, so the level of the first signal may be lower than the level of the second signal.

It should be understood that in some other embodiments, the reed switch sensor 11 may also be a normally-closed reed switch sensor which may output a high level signal in the case of sensing the action of a magnetic field and output a low level signal in the case of not sensing the action of a magnetic field. In this case, the high level signal is an example of the above first signal, and the low level signal is an example of the above second signal, so the level of the first signal may be higher than the level of the second signal. No limitation will be given here in the embodiment of the present disclosure.

Optionally, the central processing module 10 is a micro control unit (MCU); the output signal of the reed switch sensor 11 is taken as an input signal of the MCU; and the MCU determines whether the electronic price tag is normal through a low level signal or a high level signal.

The electronic price tag is connected to the server through a wired or wireless network, thereby transmitting information indicating that the electronic price tag is normal or the information indicating that the electronic price tag is abnormal to the server. The above wireless networks include, but are not limited to, the Internet, a wide area network (WAN), a metropolitan area network, a local area network (LAN), and a mobile data network. Typically, the mobile data network includes, but is not limited to, a global system for mobile communication (GSM) network, a code division multiple access (CDMA) network, a wideband code division multiple access (WCDMA) network, a long term evolution (LTE) communication network, a WIFI network, a ZigBee network, a Bluetooth network, etc. Different types of communication networks may be operated by different operators. The type of the communication network does not constitute a limitation on the embodiments of the present disclosure.

Figure 3:
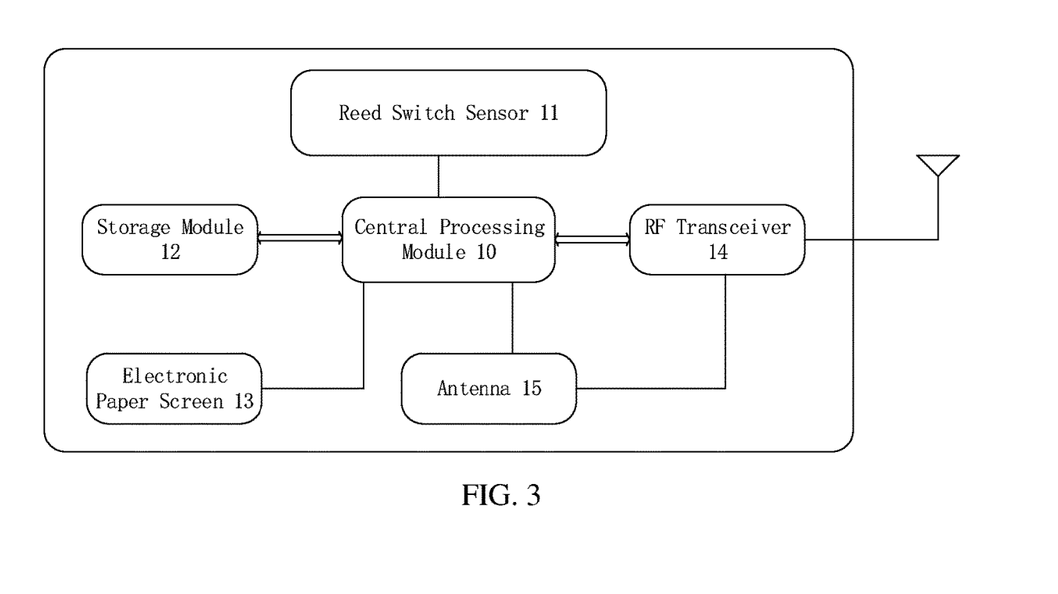
FIG. 3 is a schematic structural diagram of an electronic price tag provided by at least one embodiment of the present disclosure.

FIG. 3 is a schematic structural diagram of an electronic price tag provided by some embodiments of the present disclosure. In the embodiments, the electronic price tag comprises a reed switch sensor 11 and a central processing module 10, and further comprises a storage module 12, an electronic paper screen 13, a radio-frequency (RF) transceiver 14 and an antenna 15. The storage module 12 stores a character library. The RF transceiver 14 may communicate with the server based on the 2.4G wireless communication protocol, receive electronic price tag display information sent by the server, and send the electronic price tag display information to the central processing module 10. The central processing module 10 receives the electronic price tag display information sent by the RF transceiver 14, restores RF signals into digital signals, and then controls the electronic paper screen 13 to display corresponding information. It should be understood that the electronic paper screen 13 is only an example of a display screen in the electronic price tag, and in some other embodiments, a liquid crystal display (LCD) screen, an organic light-emitting diode (OLED)

screen or the like may also be taken as the display screen in the electronic price tag. No limitation will be given here in the embodiment of the present disclosure. In addition, it should be understood that the RF transceiver 14 is only one example of a communication apparatus in the electronic price tag; the RF transceiver 14 may also communicate with the server based on other appropriate wireless communication protocols; and in some other embodiments, a GSM transceiver, a 4G transceiver, a 5G transceiver, a Bluetooth transceiver or the like may also be taken as the communication apparatus in the electronic price tag. No limitation will be given here in the embodiment of the present disclosure. It should be understood that the storage module 12 is only an example of a memory unit in the electronic price tag. In some embodiments, a read-only memory (ROM), a random-access memory (RAM), a magnetic disk, a compact disk or the like may be taken as the memory unit of the electronic price tag. No limitation will be given here in the embodiment of the present disclosure.

Figure 4:
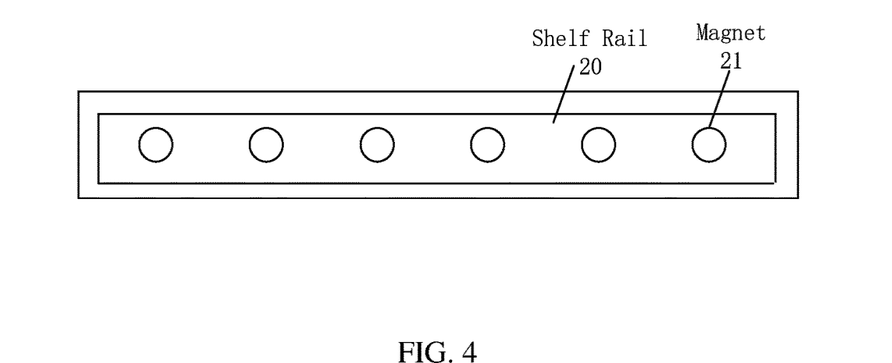
FIG. 4 is a schematic structural diagram of a shelf rail in at least one embodiment of the present disclosure.

According to at least one embodiment of the present disclosure, the present disclosure further provides an electronic price tag system, which, as shown in FIG. 4, comprises a shelf rail 20 and the electronic price tag provided by any foregoing embodiment. A magnet 21 is disposed on the shelf rail 20. When the electronic price tag is close to the magnet 21, the reed switch sensor 11 may be closed under the action of the magnet 21 and then output a low level signal. When the electronic price tag is away from the magnet 21, the reed switch sensor 11 is disconnected and then outputs a high level signal.

Optionally, the magnet 21 may be disposed on the back of the shelf rail 20. Optionally, the magnet 21 may be a magnet. After the electronic price tag is mounted on the shelf rail 20, as the magnet 21 is mounted on the back of the shelf rail 20, the reed switch sensor 11 is closed under the action of the magnet 21; Out1 outputs a low level signal; and the MCU reads the low level signal of Out1 and then converts the low level signal into information indicating that the electronic price tag is normal. When the electronic price tag is moved, as the electronic price tag is not subjected to the action of the magnet 21, the reed switch sensor 11 is disconnected; Out1 outputs a high level signal; and the MCU reads the high level signal of Out1 and then converts the high level signal into information indicating that the electronic price tag is abnormal. In some embodiments, the magnet 21 may be a permanent magnet. In some other embodiments, the magnet 21 may also be an electromagnet such as a solenoid. No limitation will be given here in the embodiment of the present disclosure.

Figure 5:
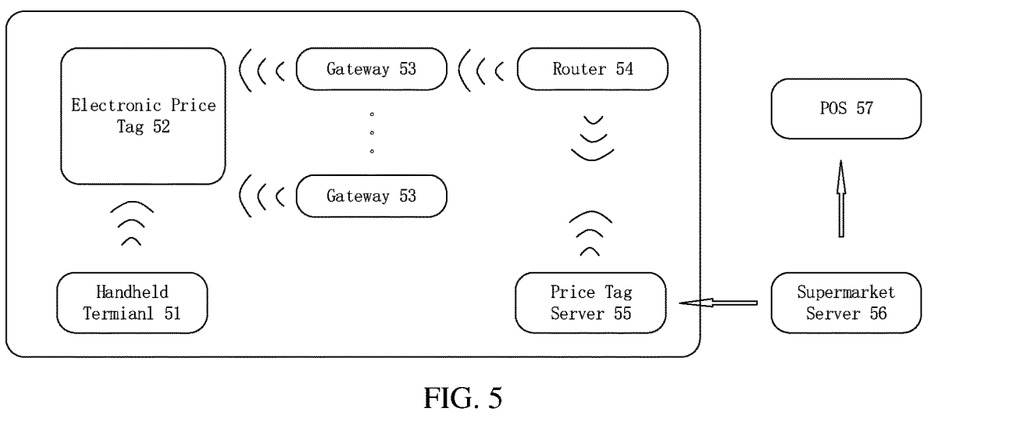
FIG. 5 a schematic structural diagram of an electronic price tag system provided by at least one embodiment of the present disclosure.

In addition, according to at least one embodiment of the present disclosure, as shown in FIG. 5, the electronic price tag system further comprises a handheld terminal 51 and a price tag server 55. The handheld terminal 51 acquires the identifier of an electronic price tag 52 and the item identifier on the corresponding shelf, binds the identifier of the electronic price tag 52 with the item identifier to generate binding information, and sends the binding information to the price tag server 55. The price tag server 55 receives the binding information, acquires the identifier of the electronic price tag 52 and the item identifier, and sends item information corresponding to the item identifier to the electronic price tag 52.

More particularly, the handheld terminal 51 scans the label on the electronic price tag 52 and the barcode of the item on the corresponding shelf, and then acquires the identifier (unique identification code) of the electronic price tag 52 and the item identifier on corresponding shelf, binds the identifier of the electronic price tag 52 with the item identifier to generate binding information, and sends the binding information to the price tag server 55 via WIFI. The price tag server 55 acquires the identifier of the electronic price tag and the item identifier after receiving the binding information of the identifier of the electronic price tag and the item identifier. At this point, an operator may perform a tag updating operation by clicking a corresponding page. In response to the tag updating operation of the operator, the price tag server 55 transmits the item information (for example, information on the origin and price of the item) corresponding to the item identifier to a router 54 and a gateway 53 via WIFI. The gateway 53 sends the item information to the electronic price tag 52 via RF signals after receiving the item information. After receiving the item information, the electronic price tag 52 displays the item information through an electronic paper screen.

At this point, if the electronic price tag 52 is subjected to the action of the magnet 21, the reed switch sensor 11 is closed, and a confirmation instruction and the information indicating that the electronic price tag is normal are sent to the price tag server 55 through the gateway 53 and the router 54; and the price tag server 55 displays information about successful tag updating and information indicating that the electronic price tag is normal. When the electronic price tag 52 is moved, as the electronic price tag 52 is not subjected to the action of the magnet 21, the reed switch sensor 11 is disconnected, and the information indicating that the electronic price tag is abnormal is sent to the price tag server 52 through the gateway 53 and the router 54; and the price tag server 52 displays the information indicating that the electronic price tag is abnormal.

Moreover, after receiving the information indicating that the electronic price tag is abnormal, the price tag server 55 sends an alarm message to an alarm device, so as to trigger the alarm device to give an alarm. Thus, the electronic price tag 52 sends the information indicating that the electronic price tag is normal or the information indicating that the electronic price tag is abnormal to the price tag server 55 in real time. When the moved electronic price tag 52 is placed back, the electronic price tag 52 is subjected to the action of the magnet 21, and the reed switch sensor 11 is closed; the information indicating that the electronic price tag is normal is sent to the price tag server 55 through the gateway 53 and the router 54; and the price tag server 55 displays the information indicating that the electronic price tag is normal.

Optionally, the system further comprises a supermarket server 56 and a point of sale (POS) 57, and the supermarket server 56 and the price tag server 55 keep the item information be synchronized, so as to ensure that the electronic price tag 52 displays accurate item information.

According to at least one embodiment of the present disclosure, the present disclosure further provides a method of updating an electronic price tag, which comprises:

acquiring by a handheld terminal an identifier of the electronic price tag and an item identifier on a corresponding shelf, binding the identifier of the electronic price tag with the item identifier to generate binding information, and sending the binding information to a server;

receiving by the server the binding information, acquiring the identifier of the electronic price tag and the item identifier, and send item information corresponding to the item identifier to the electronic price tag; and receiving and displaying by the electronic price tag the item information, and sending information indicating that the electronic price tag is normal or information indicating that the electronic price tag is abnormal to the server in real time, wherein when, the electronic price tag sends the information indicating that the electronic price tag is normal to the server in a case where the reed switch sensor is closed; and the electronic price tag sends the information indicating that the electronic price tag is abnormal to the server, in a case where the electronic price tag is disconnected.

In some embodiments of the present disclosure, the method further comprises: sending by the server an alarm message to an alarm device in response to receiving the information that the electronic price tag is abnormal, so as to trigger the alarm device to give an alarm.

As can be seen, in the embodiments of the present disclosure, the reed switch sensor is triggered to be closed or disconnected by the magnet being near to or away from the reed switch sensor, outputs a low level signal or a high level signal, sends information indicating that the electronic price tag is normal or abnormal, and then whether the display of the electronic price tag is normal is determined. According to the embodiments of the present disclosure, the electronic price tag may be prevented from being manually moved and the problem that the server cannot confirm in real time the state that the electronic price tag is moved and thus cannot update the tag data or display and update incorrect product price information is solved.

It can be clearly understood by those skilled in the art through the description of the above embodiments that the method provided by the above embodiment may be implemented by means of software and a necessary general hardware platform, and of course, may also be implemented by hardware, but in many cases, the former is a better implementation. Based on such understanding, the technical solutions of the present disclosure substantially or those portions that contribute to the prior art may be embodied in the form of a software product, and the software product is stored in a storage medium (e.g., a ROM/RAM, a magnetic disk or a compact disk), and includes a plurality of instructions for causing a terminal device (which may be a mobile phone, a computer, a server or a network device) to execute the method provided by the embodiments of the present disclosure.

It should be noted that, for the sake of brevity, the above system, method and electronic device embodiments are all described as a series of actions or combinations of modules, but it should be understood by those skilled in the art that the present disclosure is not limited by the sequence of the actions or the connections of the modules described. Some steps may be executed in other orders or concurrently in accordance with the present disclosure, and some modules may adopt other connection modes.

It should be understood by those skilled in the art that the embodiments described in the description belong to the same kind of embodiments, and the above embodiment numbers are only for the sake of description, and the involved actions and modules are not necessarily required by the present disclosure.

In the above embodiments of the present disclosure, the description on the embodiments has respective emphasis, and the parts that are not described in detail in a certain embodiment may refer to related description in other embodiments.

In the several embodiments provided by the present disclosure, it should be understood that the disclosed technical contents may be implemented in other manners. The device embodiments described above are merely illustrative. For example, the division of the units is only a logical function division. In actual implementation, there may be another division manner. For example, multiple units or components may be combined or may be integrated into another system, or some features may be ignored or not executed. In addition, the shown or discussed mutual coupling or direct coupling or communication connection may be indirect coupling or communication connection through some interfaces, units or modules, and may be electrical or in other forms.

The units described as separate components may or may not be physically separated, and the components displayed as units may or may not be physical units, that is, may be located in one place, or may be distributed to multiple network units. Some or all of the units may be selected according to actual requirements to achieve the purpose of the technical solution of the embodiment.

In addition, the functional units in the embodiments of the present disclosure may be integrated into one processing unit, or each unit may exist physically separately, or two or more units may be integrated into one unit. The above integrated unit may be implemented in the form of hardware or in the form of a software functional unit.

The integrated unit, if implemented in the form of a software functional unit and sold or used as a standalone product, may be stored in a computer readable storage medium. Based on such understanding, the technical solution of the present disclosure substantially, or the parts that contribute to the prior art, or all or part of the technical solution may be embodied in the form of a software product. The software product is stored in a storage medium, and includes a number of instructions for causing a computer device (which may be a personal computer, a server or a network device) to perform all or part of the steps in the method provided by the embodiments of the present disclosure. The foregoing storage medium includes a volatile storage medium or a non-volatile storage medium, e.g., a USB flash disk, a ROM, a RAM, a portable hard drive, a magnetic disk or an optical disk that may store program codes.

The foregoing merely are exemplary embodiments of the present disclosure, and not intended to define the scope of the present disclosure, and the scope of the disclosure is determined by the appended claims.

What is claimed is:

1. An electronic price tag, comprising a reed switch sensor and a processor, wherein
    the reed switch sensor is configured to sense a magnetic field adjacent to the electronic price tag to generate an output signal; and
    the processor is configured to:
    in response to receiving a first signal outputted by the reed switch sensor, convert the first signal into information indicating that the electronic price tag is normal, and send the information indicating that the electronic price tag is normal; and
    in response to receiving a second signal outputted by the reed switch sensor, convert the second signal into information indicating that the electronic price tag is abnormal, and send the information indicating that the electronic price tag is abnormal,
    the first signal is a signal generated by the reed switch sensor in case of sensing the magnetic field; and
    the second signal is a signal generated by the reed switch sensor in case of not sensing the magnetic field.

2. The electronic price tag according to claim 1, wherein the reed switch sensor is a normally-open reed switch sensor.

3. The electronic price tag according to claim 1, further comprising:

a display screen configured to display item information under a control of the processor.

4. The electronic price tag according to claim 3, wherein the display screen comprises an electronic paper screen.

5. The electronic price tag according to claim 1, further comprising:
   a communication apparatus configured to receive item information sent by a server and send the item information to the processor.

6. The electronic price tag according to claim 5, wherein the communication apparatus comprises a radio-frequency transceiver, and the radio-frequency transceiver is configured to communicate with the server based on a 2.4G wireless communication protocol.

7. The electronic price tag according to claim 1, further comprising:
   a memory unit configured to store character library information for displaying item information.

8. An electronic price tag system, comprising a shelf rail and the electronic price tag according to claim 1, wherein
   a magnet is disposed on the shelf rail; and
   the reed switch sensor is configured to generate the output signal under an action of the magnet in a case where the electronic price tag is mounted on the shelf rail.

9. The electronic price tag system according to claim 8, wherein the reed switch sensor is configured to be closed under the action of the magnet to generate the output signal, so that the processor converts the output signal into information indicating that the electronic price tag is normal.

10. The electronic price tag system according to claim 8, further comprising:
    a handheld terminal configured to: acquire an identifier of the electronic price tag and an item identifier on a corresponding shelf, bind the identifier of the electronic price tag with the item identifier to generate binding information, and send the binding information to the server; and
    the server is configured to: receive the binding information, acquire the identifier of the electronic price tag and the item identifier, and send item information corresponding to the item identifier to the electronic price tag.

11. The electronic price tag system according to claim 10, wherein the electronic price tag is configured to receive and display the item information.

12. The electronic price tag system according to claim 10, wherein the electronic price tag is configured to:
    send information indicating that the electronic price tag is normal to the server in a case where the reed switch sensor is closed; and
    send information indicating that the electronic price tag is abnormal to the server in a case where the reed switch sensor is disconnected.

13. The electronic price tag system according to claim 8, wherein the electronic price tag is configured to:
    send information indicating that the electronic price tag is normal to the server, based on the output signal generated by the reed switch sensor in a case where the reed switch sensor senses the magnet; and
    send information indicating that the electronic price tag is abnormal to the server, based on the output signal generated by the reed switch sensor in a case where the reed switch sensor does not sense the magnet.

14. The electronic price tag system according to claim 11, wherein the electronic price tag is configured to: send information indicating that the electronic price tag is normal or information indicating that the electronic price tag is abnormal to the server in real time.

15. The electronic price tag system according to claim 14, wherein the server is configured to:
    send an alarm message to an alarm device in response to receiving the information indicating that the electronic price tag is abnormal, so as to trigger the alarm device to give an alarm.

16. A method of updating an electronic price tag, comprising:
    acquiring by a handheld terminal an identifier of the electronic price tag and an item identifier on a corresponding shelf, binding the identifier of the electronic price tag with the item identifier to generate binding information, and sending the binding information to a server;
    receiving by a server the binding information, acquiring the identifier of the electronic price tag and the item identifier, and sending item information corresponding to the item identifier to the electronic price tag; and
    receiving and displaying by the electronic price tag the item information, and sending information indicating that the electronic price tag is normal or information indicating that the electronic price tag is abnormal to the server in real time, wherein
    the electronic price tag comprises a reed switch sensor and a processor,
    the reed switch sensor is configured to sense a magnetic field adjacent to the electronic price tag to generate an output signal, and
    the processor is configured to:
    in response to receiving a first signal outputted by the reed switch sensor, convert the first signal into information indicating that the electronic price tag is normal, and send the information indicating that the electronic price tag is normal; and
    in response to receiving a second signal outputted by the reed switch sensor, convert the second signal into information indicating that the electronic price tag is abnormal, and send the information indicating that the electronic price tag is abnormal,
    wherein the first signal is a signal generated by the reed switch sensor in case of sensing the magnetic field; and
    the second signal is a signal generated by the reed switch sensor in case of not sensing the magnetic field.

17. The method of updating the electronic price tag according to claim 16, wherein
    the electronic price tag sends the information indicating that the electronic price tag is normal to the server in a case where the reed switch sensor is closed, and
    the electronic price tag sends the information indicating that the electronic price tag is abnormal to the server in a case where the reed switch sensor is disconnected.

18. The method of updating the electronic price tag according to claim 16, further comprising:
    sending by the server an alarm message to an alarm device in response to receiving the information indicating that the electronic price tag is abnormal, so as to trigger the alarm device to given an alarm.

* * * * *